Sept. 11, 1923.  W. D. HANSEN  1,467,543
ROLL FILM FOR CAMERAS
Filed Nov. 30, 1920
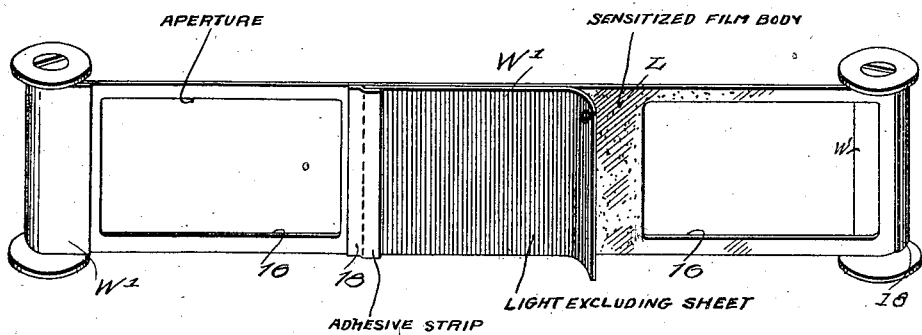
INVENTOR
WILLIAM D. HANSEN,
BY
ATTORNEYS Patented Sept. 11, 1923.

1,467,543

UNITED STATES PATENT OFFICE.

WILLIAM DUUS HANSEN, OF CHICAGO, ILLINOIS.

ROLL FILM FOR CAMERAS.

Application filed November 30, 1920. Serial No. 427,356.

*To all whom it may concern:*

Be it known that I, WILLIAM DUUS HANSEN, a citizen of the United States, and a resident of Chicago, in the county of Cook and State of Illinois, have invented certain new and useful Improvements in Roll Films for Cameras, of which the following is a specification.

My invention relates to roll film for a camera of that type having a focusing opening in its rear end, and a purpose of my invention is the provision of a roll film so constructed as to permit of the successive presentation of portions of the film to the focusing opening and to allow of the focusing of the camera lens through such opening prior to each exposure.

In carrying out my invention, I provide a roll film divided along its length into sensitized portions, and portions between the sensitized portions through which one can clearly observe the lens of the camera and the objects to be photographed so that an accurate focusing of the lens can be made prior to the taking of each picture. In the present instance, I provide a roll film having apertures or windows formed therein in such manner that as the film is unwound from the spool an aperture is presented to the focusing opening of the camera prior to the presentation of the sensitized portion.

In the accompanying drawing,

The figure is a perspective view of one form of film embodying my invention arranged in proper position upon a pair of spools.

Referring specifically to the drawing, the roll film is designated at L, and apertures or windows therein at 16.

Light excluding sheets are indicated at W', each of the sheets comprising a rectangular section of suitable paper removably secured at one end to the film L by an adhesive strip 18. The opposite end of the sheet is preferably unattached because as the film is unwound and rewound within the camera, the inner walls of the camera will serve to maintain the sheet in contiguous relation with respect to the film.

Although I have herein shown and described only one form of film and one form of light excluding sheet, it is to be understood that various changes and modifications may be made herein without departing from the spirit of the invention and the spirit and scope of the appended claim.

I claim:

In combination, a film having apertures formed at spaced intervals along its length, a plurality of light excluding sheets, each being substantially co-extensive in width and length with the portion of the film extending between each two adjacent apertures, and strips of adhesive arranged transversely of the film and securing corresponding ends of the light excluding sheets to the same side of said film in such manner that the respective light excluding sheets cover the portions of the film extending between said apertures when the said light excluding sheets are moved in flatwise contiguous relation to the film.

WILLIAM DUUS HANSEN.